(12) United States Patent
Jones et al.

(10) Patent No.: US 8,328,483 B2
(45) Date of Patent: Dec. 11, 2012

(54) BLIND RIVET

(75) Inventors: Steven V. Jones, Birmingham (GB);
Stephen Morris, Sutton Coldfield (GB);
James Hughes, Birmingham (GB)

(73) Assignee: Newfrey LLC, Newark, DE (US)

(*) Notice: Subject to any disclaimer, the term of this patent is extended or adjusted under 35 U.S.C. 154(b) by 976 days.

(21) Appl. No.: 10/430,742

(22) Filed: May 6, 2003

(65) Prior Publication Data

US 2004/0022597 A1 Feb. 5, 2004

(30) Foreign Application Priority Data

May 8, 2002 (GB) .................................. 0210463.6

(51) Int. Cl.
*F16B 13/04* (2006.01)

(52) U.S. Cl. ........ 411/43; 29/512; 29/525.06; 29/524.1; 411/501

(58) Field of Classification Search .................. 411/501, 411/43, 45–48; 403/279, 280, 282; 29/512, 29/524.1, 525.06, 243.521, 243.53
See application file for complete search history.

(56) References Cited

U.S. PATENT DOCUMENTS

| | | | |
|---|---|---|---|
| 1,979,686 A | 11/1934 | Hall et al. | |
| 1,996,128 A * | 4/1935 | Thomson | 411/27 |
| 2,146,461 A | 2/1939 | Bettington | |
| 2,183,543 A | 12/1939 | Cherry | |
| 2,328,023 A | 8/1943 | Lang | |
| 2,366,965 A | 1/1945 | Johnson | |
| 2,371,423 A * | 3/1945 | Buchet | 411/45 |
| 2,371,452 A * | 3/1945 | Lees, Jr. | 411/501 |
| 2,384,321 A * | 9/1945 | Lees, Jr. | 411/41 |
| 2,546,602 A | 3/1951 | Keating | |
| 2,774,098 A * | 12/1956 | Tieri | 16/228 |
| 2,885,798 A * | 5/1959 | Palmer et al. | 36/34 R |
| 3,047,181 A | 7/1962 | Heidenwolf | |
| 3,055,255 A | 9/1962 | Burrell | |
| 3,144,158 A * | 8/1964 | Nouvelet | 29/243.521 |

(Continued)

FOREIGN PATENT DOCUMENTS

DE 3612501 10/1987

(Continued)

OTHER PUBLICATIONS

Brochure entitled "Cherry Commercial Products—Cherry C Rivets", (published prior to 2002), 6 pages.

(Continued)

*Primary Examiner* — Lloyd Gall
(74) *Attorney, Agent, or Firm* — Harness, Dickey & Pierce, P.L.C.

(57) ABSTRACT

There is provided a blind rivet (10) comprising an axially extending hollow tubular body (18) having a tail end face (22) at one end and a pre-formed radially enlarged flange (20) at the other end, together with a mandrel (30) having a stem (32) which extends co-axially though the body (18) and having enlarged head adjacent the tail end (22) of the body, the stem having a weakened region immediately adjacent the head, whereby the mandrel head having an outer diameter greater than an outer diameter of the body, usually by between 4% and 9%, and which has a uniform conical shoulder (38) extending between the outer diameter of the head and the stem (32), so as to exert a setting force having an axial component for compressing the rivet body axially and an angular component effecting conical deformation of the tail end radially.

25 Claims, 2 Drawing Sheets

U.S. PATENT DOCUMENTS

| | | | |
|---|---|---|---|
| 3,148,578 | A | 9/1964 | Gapp |
| 3,390,601 | A * | 7/1968 | Summerlin ................ 411/43 |
| 3,424,051 | A | 1/1969 | Baugh |
| 3,438,301 | A | 4/1969 | Mattioli |
| 3,459,447 | A | 8/1969 | Hurd et al. |
| 3,460,429 | A | 8/1969 | La Torre |
| 3,491,649 | A | 1/1970 | Smouton et al. |
| 3,750,518 | A | 8/1973 | Rayburn |
| 3,835,688 | A | 9/1974 | King, Jr. |
| 3,837,208 | A | 9/1974 | Davis et al. |
| 3,915,055 | A | 10/1975 | Binns |
| 3,922,586 | A | 11/1975 | Buxton et al. |
| 3,949,535 | A | 4/1976 | King, Jr. |
| 3,975,786 | A | 8/1976 | Gapp et al. |
| 4,003,288 | A | 1/1977 | Jeal |
| 4,044,591 | A | 8/1977 | Powderley |
| 4,137,817 | A | 2/1979 | Siebol |
| 4,164,807 | A | 8/1979 | King, Jr. |
| 4,236,429 | A * | 12/1980 | Dolch ...................... 411/41 |
| 4,261,245 | A * | 4/1981 | Mauer ...................... 411/43 |
| 4,388,031 | A | 6/1983 | Rodgers |
| 4,407,619 | A * | 10/1983 | Siebol ...................... 411/43 |
| 4,447,944 | A * | 5/1984 | Mohrman ................ 29/512 |
| 4,466,048 | A | 8/1984 | Schwab |
| 4,473,914 | A * | 10/1984 | Haft ........................ 470/11 |
| 4,497,603 | A | 2/1985 | Boucher et al. |
| 4,507,706 | A | 3/1985 | Trexler, Jr. |
| 4,541,032 | A | 9/1985 | Schwab |
| 4,541,761 | A * | 9/1985 | Bryce, Jr. ................ 411/34 |
| 4,585,382 | A * | 4/1986 | Bryce, Jr. ................ 411/34 |
| 4,620,825 | A | 11/1986 | Potzas |
| 4,659,271 | A * | 4/1987 | Pratt et al. ............... 411/43 |
| 4,702,655 | A * | 10/1987 | Kendall ................... 411/43 |
| 4,736,560 | A | 4/1988 | Murphy |
| 4,765,010 | A | 8/1988 | Jeal et al. ................ 10/27 R |
| 4,781,501 | A * | 11/1988 | Jeal et al. ................ 411/43 |
| 4,836,728 | A | 6/1989 | Mauer et al. |
| 4,858,067 | A | 8/1989 | Rochelle et al. |
| 4,863,325 | A * | 9/1989 | Smith ...................... 411/43 |
| 4,893,390 | A | 1/1990 | Hoeffken |
| 4,897,003 | A | 1/1990 | Bradley et al. |
| 4,904,133 | A | 2/1990 | Wright |
| 4,909,687 | A * | 3/1990 | Bradley et al. ........... 411/43 |
| 4,929,137 | A * | 5/1990 | Bossenmaier ........... 411/501 |
| 4,958,971 | A | 9/1990 | Lacey et al. |
| 4,969,785 | A | 11/1990 | Wright |
| 5,006,024 | A * | 4/1991 | Siebol ...................... 411/43 |
| 5,035,129 | A | 7/1991 | Denham et al. |
| 5,044,850 | A | 9/1991 | Getten et al. |
| 5,054,977 | A * | 10/1991 | Schultz .................... 417/43 |
| 5,167,585 | A | 12/1992 | Williams |
| 5,252,013 | A * | 10/1993 | Browne et al. .......... 411/43 |
| 5,259,713 | A | 11/1993 | Renner et al. |
| 5,299,667 | A * | 4/1994 | Hammond ............ 188/218 XL |
| 5,320,465 | A * | 6/1994 | Smith ...................... 411/43 |
| 5,333,980 | A | 8/1994 | Pratt et al. |
| 5,359,765 | A | 11/1994 | Auriol et al. |
| 5,378,098 | A | 1/1995 | Andrews et al. |
| 5,403,135 | A | 4/1995 | Renner et al. |
| 5,443,344 | A | 8/1995 | Underwood, Jr. |
| 5,476,350 | A | 12/1995 | Kurtz et al. |
| 5,496,140 | A | 3/1996 | Gossmann et al. |
| 5,503,510 | A | 4/1996 | Golan |
| 5,551,817 | A | 9/1996 | Kanie |
| 5,569,006 | A | 10/1996 | Alvarado et al. |
| 5,645,383 | A | 7/1997 | Williams |
| 5,651,172 | A * | 7/1997 | Auriol et al. ............ 29/512 |
| 5,658,107 | A | 8/1997 | Smith |
| 5,689,873 | A | 11/1997 | Luhm |
| 5,741,099 | A * | 4/1998 | Aasgaard ................ 411/29 |
| 5,743,691 | A | 4/1998 | Donovan |
| 5,759,001 | A | 6/1998 | Smith |
| 5,881,989 | A * | 3/1999 | O'Brien et al. .......... 248/634 |
| 5,889,648 | A | 3/1999 | Heavirland et al. |
| 5,890,693 | A | 4/1999 | Do et al. |
| 5,915,901 | A * | 6/1999 | Aasgaard ................ 411/29 |
| 5,960,667 | A | 10/1999 | Hylwa et al. |
| 5,982,610 | A | 11/1999 | Crawford et al. |
| 6,004,086 | A | 12/1999 | Gand et al. |
| 6,007,287 | A | 12/1999 | Toosky et al. |
| 6,042,313 | A * | 3/2000 | Dehlke ..................... 411/43 |
| 6,081,984 | A | 7/2000 | Sherry |
| 6,171,038 | B1 | 1/2001 | Pratt et al. |
| 6,224,310 | B1 | 5/2001 | Summerlin et al. |
| 6,254,324 | B1 | 7/2001 | Smith et al. |
| 6,276,050 | B1 | 8/2001 | Mauer et al. |
| 6,299,398 | B1 | 10/2001 | Shinjo |
| 6,389,676 | B1 | 5/2002 | Denham |
| 6,398,472 | B1 | 6/2002 | Jones |
| 6,418,599 | B2 | 7/2002 | Suzuki et al. |
| 6,428,255 | B1 | 8/2002 | Smith |
| 6,443,322 | B1 | 9/2002 | Braun et al. |
| 6,445,568 | B1 | 9/2002 | Baur et al. |
| 6,461,213 | B1 | 10/2002 | Volz |
| 6,484,370 | B2 | 11/2002 | Kanie et al. |
| 6,502,008 | B2 | 12/2002 | Maurer et al. |
| 6,553,622 | B2 | 4/2003 | Maruyama et al. |
| 6,637,995 | B1 | 10/2003 | White |
| 6,746,192 | B2 | 6/2004 | Eshraghi |
| 6,751,841 | B2 * | 6/2004 | Schnabel et al. ......... 29/524.1 |
| 6,754,066 | B2 | 6/2004 | Doan et al. |
| RE38,664 | E | 11/2004 | Luhm |
| 6,826,820 | B2 | 12/2004 | Denham et al. |
| 6,854,940 | B2 | 2/2005 | Jennings et al. |
| 6,877,204 | B1 | 4/2005 | Schnabel et al. |
| 6,881,898 | B2 | 4/2005 | Baker et al. |
| 6,898,918 | B2 | 5/2005 | Eshraghi |
| 6,905,296 | B2 | 6/2005 | Millington |
| RE39,582 | E | 4/2007 | Luhm |
| 2001/0005475 | A1 | 6/2001 | Frigg ...................... 411/501 |
| 2003/0082025 | A1 | 5/2003 | Luhm |
| 2004/0022597 | A1 | 2/2004 | Jones et al. |
| 2004/0071522 | A1 | 4/2004 | Millington |
| 2004/0071525 | A1 | 4/2004 | Millington |
| 2004/0247414 | A1 | 12/2004 | Pearce et al. |
| 2005/0100423 | A1 | 5/2005 | Summerlin |
| 2005/0214094 | A1 | 9/2005 | Summerlin |
| 2006/0251490 | A1 | 11/2006 | Kleinman et al. |
| 2007/0154277 | A1 | 7/2007 | Smith et al. |

FOREIGN PATENT DOCUMENTS

| | | |
|---|---|---|
| DE | 40 03 136 A1 | 8/1991 |
| EP | 0 251 700 A2 | 1/1988 |
| EP | 635647 | 6/1994 |
| FR | 1494693 | 9/1967 |
| FR | 1553116 | 1/1969 |
| GB | 642664 | 9/1950 |
| GB | 1066033 | 4/1967 |
| GB | 1183049 | 3/1970 |
| GB | 1495592 | 12/1977 |
| GB | 1 572 269 | 7/1980 |
| JP | 62155318 | 7/1987 |
| JP | 63001808 | 1/1988 |
| JP | 3048106 | 5/1991 |
| JP | 05-335756 | 12/1993 |
| JP | 7012112 | 12/1995 |
| JP | 08086304 | 4/1996 |
| JP | 11-284357 | 10/1999 |
| JP | 2000-277947 | 10/2000 |

OTHER PUBLICATIONS

Photograph of Emhart blind rivet Part No. 14021 (believed to have been publicly used prior to May 2002).

Photograph of Emhart blind rivet Part No. 14045 (believed to have been publicly used prior to May 2002).

Photograph of Emhart blind rivet Part No. 14046M (believed to have been publicly used prior to May 2002).

Photograph of Emhart blind rivet Part No. 14171 (believed to have been publicly used prior to May 2002).

Photograph of Emhart blind rivet Part No. 15780 (believed to have been publicly used prior to May 2002).

Photograph of Emhart blind rivet Part No. 15780M (believed to have been publicly used prior to May 2002).

Photograph of Emhart blind rivet Part No. 15891 (believed to have been publicly used prior to May 2002).
Photograph of Emhart blind rivet Part No. 16220M (believed to have been publicly used prior to May 2002).
Photograph of Emhart blind rivet Part No. 16225 (believed to have been publicly used prior to May 2002)
Photograph of Emhart blind rivet Part No. 16226 (believed to have been publicly used prior to May 2002).
Photograph of Emhart blind rivet Part No. 16289 (believed to have been publicly used prior to May 2002).
CHOBERT® Fastening Systems—Product Information brochure published Jan. 1997 (4 pages).
BRIV® Fastening Systems—Product Information brochure published Jan. 1997 (4 pages).

Mark P. Spector, "Blind Riveting of Plastics," 'Design/Fastening/Joining', believed to have been published before 2002 (4 pages).
"Don't Overlook Blind Riveting When Designing Your Next Product," 'Design Engineering Feature', 'Product Engineering', Jul. 1974 (4 pages).
"Design Considerations for Blind Fasteners," 'OEM Design', Jul. 1992 (2 pages).
Paul A. Gustafson et al. "For Special Applications: Special Blind Rivets", 'AE Design/Fastening/Joining', Aug. 1979 (3 pages).
"Assembly Directory & Handbook", Hitchcock Publishing Company, vol. 5, 1966, pp. 218-249.

* cited by examiner

BLIND RIVET

FIELD OF THE INVENTION

The present invention is directed towards a blind rivet and more particularly to a blind rivet of the head break type whereby a mandrel head is ejected from the rivet body after setting.

BACKGROUND OF THE INVENTION

Conventional blind rivets comprise an outer tubular shell or body having an enlarged flange at one end, together with a mandrel associated therewith, such mandrel comprising a cylindrical stem extending through the tubular rivet body so as to be coaxial therewith, the stem having a radially enlarged head at one end for engagement with an end face (tail end) of the rivet body remote from the enlarged flange. The blind rivet is then passed through a preformed hole in a workpiece until the flange engages with the edge of the hole and is held in engagement therewith during a setting operation. During setting, the remote end of the rivet, which is disposed inwardly of the work pieces (the blind side), is then compressed towards the flange by drawing the mandrel stem, and hence the mandrel head, back towards the flange, whereby the deformed portion of the rivet body compresses the work piece therebetween with the flange itself.

Of this type of blind rivet there are two main types. A break stem type blind rivet relies on the mandrel head entering the tail end of the rivet body and being pulled through the rivet body so as to be encapsulated thereby, until the mandrel head meets resistance as the expanded rivet body engages the blind side of the work pieces, whereby the subsequent increase in load on the mandrel stem causes this stem to break at a predefined weakened region so that the mandrel head is retained within the rivet body to form an expanded portion or bulge of the rivet body on the blind side of the work piece thereby compressing the work pieces between this enlarged region and the flange.

Alternatively, a break head type blind rivet relies upon the mandrel head being ejected following setting. In this type of blind rivet, the mandrel head has an abrupt change of section between the mandrel stem and the mandrel head to present a shoulder portion which engages the tail end of the blind rivet to exert a substantially axial force thereon thereby compressing and deforming the end of the rivet against the blind side of the work piece to form a flattened bulge between which the work pieces are again compressed against the flange. Here again a weakened region of the stem will again break, but since the mandrel head has not being drawn into the rivet body it is simply ejected away therefrom when the stem breaks due to the high reaction force between the deformed rivet body and the head.

However, in both these conventional types of blind rivet, a defined or enlarged section of the blind rivet is maintained on the blind side of the work piece presenting a projection which may limit the available workspace on the blind side of the work pieces. This is particularly relevant in the use of blind rivets to manufacture small cabinets, such as those used in the computer industry, whereby the internal projection of a set blind rivet may interfere with the placement of components within such cabinets.

It is therefore an object of the current invention to provide an improved blind rivet which alleviates the aforementioned problems.

SUMMARY OF THE INVENTION

According to the present invention there is now provided a blind rivet comprising an axially extending hollow tubular body having a tail end face at one end, and a pre-formed radially enlarged flange at the other end, the rivet further comprising a mandrel having a stem which extends co-axially through the tubular body and having an enlarged head adjacent the tail end of the body, this head having an outer diameter greater than an inner diameter of the body, wherein the mandrel has a uniform conical shoulder extending between the outer diameter of the head and the stem, the stem being further provided with a weakened region immediately adjacent this conical shoulder. Preferably the angle of this conical surface will be inclined at an angle between 91 and 110° to the axis will usually lie between 98 and 102°. Ideally, this angle will be at 100°. The use of such a conical surface to form a conical shoulder at these angles has been found to transmit a force, as the mandrel head is drawn into the rivet body, which has an axial component serving to compress the rivet body and also has a axially inclined component which serves to deform the tail end face of the rivet body conically outwards of its axis.

It is also preferred that the head diameter of the mandrel head is between 4% and 9% greater than an outer diameter of the tubular rivet body. For this reason, the rivet is intended to be inserted into a preformed hole extending through a workpiece/s which must have a diameter greater than this maximum head diameter and which is usually provided to have a diameter 10% greater than the body diameter. However, the hole diameter may lie in a range of 9% and 15% greater than the body diameter, dependent on the head diameter. This increased diameter of the head alleviates the possibility of the head being drawn into the rivet body during setting.

Furthermore, it is preferred that the mandrel head has an outer cylindrical diameter, usually co-axial with the rivet body, having an axial length of at least 1 mm, again to alleviate the possibility of the conically deformed body encompassing the mandrel head during the setting operation and, further, to prevent the head from becoming distorted (or "dished") under the large loads applied thereto during a setting operation.

It is also preferred that the axial length of the rivet body will be between 25% and 55% greater than the grip thickness of such rivet, the grip thickness being defined as the combined thickness of the work pieces being joined together by this rivet and hence the thickness to be gripped thereby. This predefined rivet body length ensures that there is sufficient rivet body material to form an appropriate rivet joint and to flow into the preformed hole in the workpieces without resulting in excess rivet body material projecting excessively from the blind side of the connected work pieces once set.

Further according to the present invention there is also provided a method of fastening together at least two work pieces using a blind rivet, which method comprises the steps of selecting an axially extending blind rivet having a body with a length between 25% and 55% greater than the combined thickness of the at least two work pieces, the body also having a known outer diameter, then, pre-forming a hole through the workpieces, which hole having a diameter between 9% and 15% greater than the outer diameter of the rivet body, and subsequently inserting the blind rivet through this hole; this method then provides the step of applying an axial setting force to the rivet body by use of a mandrel head having a conical shoulder, whereby this setting force has a first axial component which is exerted in the axial direction to compress the rivet body into the hole and a second annular component to deform the rivet body conically outwards of its axis. Furthermore, it is preferred that the hole forming step comprises providing the blind side of the hole with a countersunk region so that the conical deformation of the rivet body is deformed into the counter-sunk region of the hole, so as not to project substantially proud of the blind side of the workpiece.

Preferably, this method will comprise the selecting and inserting of a blind rivet according to the present invention and as described above.

The preferred embodiment of the present invention will now be described, by way of example only, with reference to the accompanying, illustrative drawings in which:

DETAILED DESCRIPTION OF THE PREFERRED EMBODIMENTS

Figure 1:
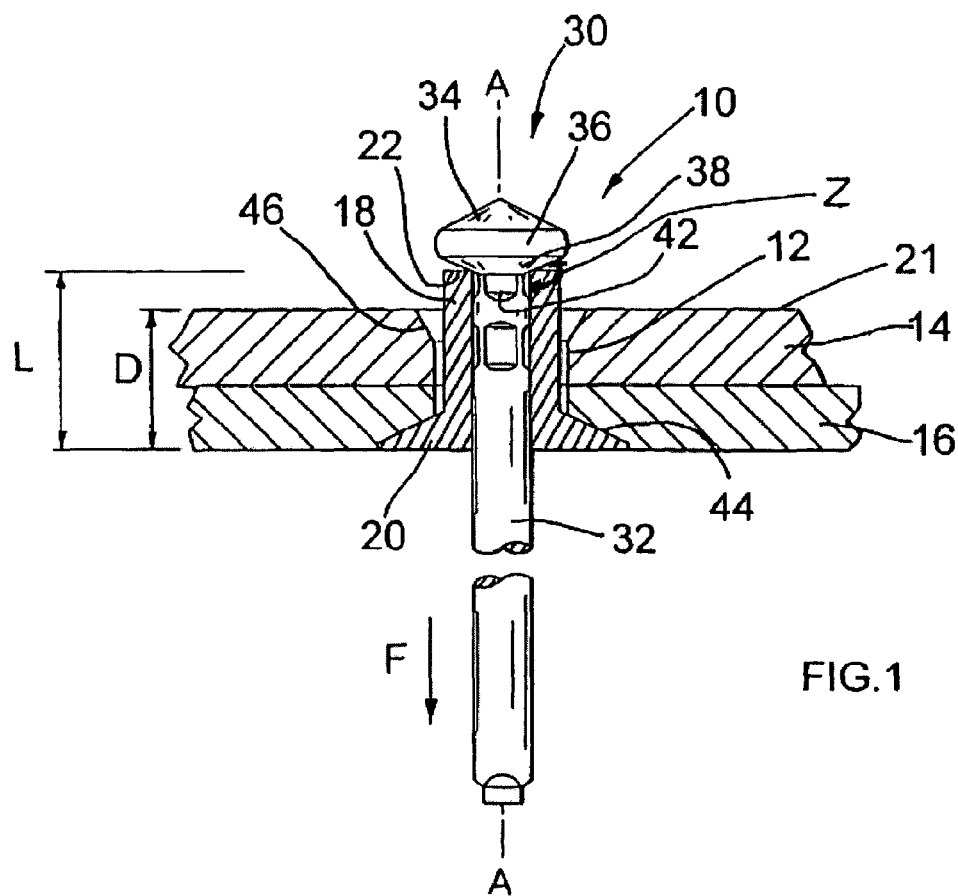
FIG. 1 is a partial cross-section of a blind rivet according to the present invention inserted through a workpiece.

Referring now to FIG. 1, a blind rivet assembly 10 is shown inserted, but not set, in a preformed hole 12 extending between two work pieces 14 and 16. The rivet assembly 10 comprises a hollow tubular rivet body 18 having an enlarged counter-sunk flange 20, this counter-sunk head tapering inwards along an axis A of the rivet body for complimentary receipt within a pre-formed counter-sunk region 44 of the hole 12.

The remote tail end 22 of the rivet body 18, axially opposed to the flange 20, has a substantially flat end face extending perpendicular to the rivet axis A. The rivet body length L is predetermined to be between 25% and 55% greater than the combined depth D of the two work pieces 14 and 16. This depth D is commonly referred to as the grip thickness of a blind rivet—defined as the thickness of material to be gripped by the set rivet. In the present embodiment, depth L is approximately 30% greater than depth D. As is conventional for blind rivets, the assembly 10 is further provided with a mandrel 30 comprising a cylindrical mandrel stem having an enlarged head 34 at its blind end thereof which lies adjacent to the tail end 22 of the rivet body 18. The mandrel stem 32 is of substantially uniform cross-section area along its axial length and which diameter is substantially equal to the internal diameter of the tubular rivet body 18 so as to form a complimentary frictional fit therewith.

The mandrel head 34 has a maximum outer diameter defined by a radial wall 36 extending coaxial about the axis A and having an axial length of at least 1 mm. This minimum axial length of the mandrel head is required to provide appropriate strength to the head to alleviate the possibility of the mandrel head distorting, or "dishing" when it is subject to large stresses during the rivet setting operation and particularly when the circumference of the head is engaged with the rivet body to effect deformation thereof (as described below).

The diameter of this wall 36 is greater than the maximum outer diameter of the rivet body so as to be at least 4% greater than the body diameter, but no greater than 9% thereof.

The shoulder 38 of the mandrel head, extending between the outer wall 36 and the mandrel stem, is axially inclined to form a substantially uniform conical surface which has a preferred angle Z of inclination, relative to the axis A, of 100°, although this angle Z of conical angular inclination can lie between the ranges of 91 and 110° to remain within acceptable operational parameters. This angular range has been determined to be appropriate for effecting the required deformation of the rivet during setting.

The remote end of the mandrel head is also provide with a conical surface about axis A to act as an alignment mechanism for the assembly 10, whereby the inclined surfaces thereof help align the assembly with the hole 12 as it is being inserted therein.

The mandrel head diameter is required to be at least 4% greater than the outer diameter of the rivet body to alleviate this head being pulled into the body during the setting operation, which could prevent the head being ejected after setting. However, this diameter must not exceed 9% greater than the rivet body otherwise too large a hole will be required through the workpieces to allow the rivet to pass therethrough, making the filling of this hole difficult during setting (possibly leaving the set rivet loosely set) or the closer the hole diameter is to the diameter of the flange the risk of failure of the set rivet increases.

Furthermore, the mandrel stem 32 is provided with a preformed weakened region 42 immediately adjacent this conical surface 38. As is conventional for blind rivets, this weakened region 42 is formed as a narrowed portion of the stem resulting from squaring off the stem diameter to provide four flats about the diameter so as to present a substantially square cross-sectional area immediately adjacent the head being thinner, and hence weaker, than the main mandrel stem. Alternatively, the weakened portion could result from two or more diametrically opposed indentations or even a circumferential groove. What is important here is that such weakened portion be immediately adjacent the mandrel head.

Since the mandrel head 34 has a diameter greater than the rivet body 18, it is essential that the preformed hole 12 be of a diameter at least equal to that of the maximum mandrel head diameter and is usually formed to be 10% greater than the maximum diameter of the body (since the maximum diameter of the head is limited to 9% greater than the maximum diameter of the body). However, the hole 12 can be formed to have a diameter of between 9% and 15% greater diameter than that of the maximum body diameter, dependent on the exact diameter ratio of the mandrel head to rivet body. Usually the blind rivet system utilising a rivet according to the present invention will be compatible with standard hole sizes made with existing standard size drill bits (i.e. the rivet body diameter being such that the holes are 10% greater in diameter) although different size rivets could also be produced but requiring specific hole forming tools (drill bit) which will be of appropriate diameter to use with such rivets.

Furthermore, the preformed hole 12, whilst having a counter-sunk region 44 to accommodate the counter-sunk head 20 of the rivet body, will also have formed on the blind side region 21 of the workpieces (ie. the inner side or that side opposite to the setting tool) a conical counter-sunk region 46 extending about the periphery of the hole.

Once the rivet assembly 10 has been inserted through this preformed hole 12 it may be set using a conventional blind rivet setting tool (not shown) which comprises a nose portion for restraining the rivet body flange (or head) 20 in solid abutment with the work piece 16, whilst having a displaceable jaw mechanism for clamping the mandrel stem 32 and exerting a setting force F in the direction shown substantially by the arrow F in FIG. 1.

The application of the setting force F draws the mandrel head into engagement with the flat surface of tail end portion 22 of the rivet body which, due to its conical shoulder 38, exerts a setting force having a first component extending in an axial direction and which serves to compress the rivet body 18 towards the rivet flange 20, resulting in radial expansion of the compressed (reduced length) rivet body so as to fill the enlarged hole 12 (this radial expansion being outwardly, due to the mandrel stem being maintained through the body 18). The conical shoulder 38 also provides a secondary force component perpendicular to the conical surface of the such 38 which serves to deform the tail end 22 of the rivet body radially and conically outwards so that the mandrel head 34 does not substantially enter this shortened rivet body which, due to the axial length of the walls 36 (and the restricted length of the rivet body) is also unable to encompass and surround the mandrel head 34. Rather, some of the material of tail end 22 of the rivet 18 is partially displaced axially towards the rivet head 20 with the remaining material of the rivet body in this tail end region forming a considerably thinned conical outer wall (FIG. 2) which is displaced into the counter-sunk region 46 of the hole 12 so as not to project externally of the secured workpieces. Thus the combination of the conical shoulder 38 of the mandrel and the countersunk region 46 serve to provide such conical spreading of the tail end of the body.

Continued axial displacement of the mandrel in direction F results in an increased resistance force encountered by the mandrel head 34 as it encounters the workpiece 14, and which subsequently prevents further displacement of the mandrel head. Continued application of the setting force F the increases the stress on the mandrel stem in a conventional manner until resulting failure of the mandrel stem 32 at the weakened region 42. The resultant re-action force between the rivet head 34 and the rivet body 18 causing ejection of the rivet head 34 therefrom.

Figure 2:
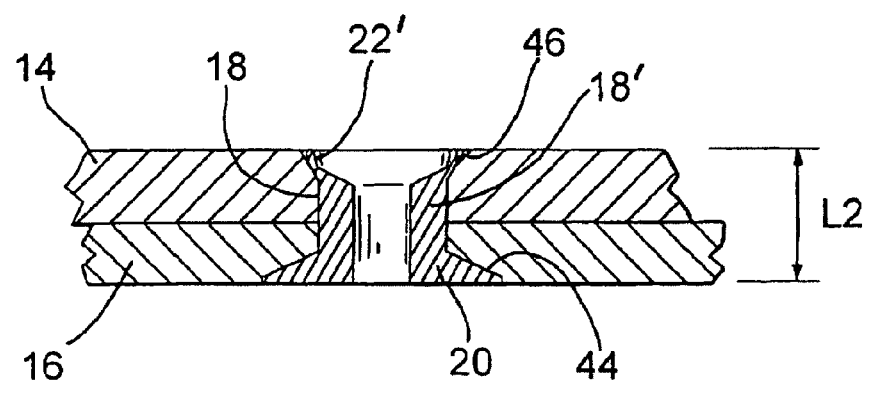
FIG. 2 is a cross-sectional view of the set rivet body of the rivet of FIG. 1.

The resultant set blind rivet is shown in FIG. 2 having a compressed axial length L2, substantially equal to the grip thickness D, whereby the axially displaced rivet body material has been squeezed into the enlarged hole 12 to provide a rivet body having an increased body thickness 18' in this region and which has a substantially conical, cup-shaped tail end 22' formed into the counter-sunk region 46 of the pre-formed hole 12. In this manner, a substantially rigid rivet joint is formed which does not extend substantially proud of the blind side of the work piece 14.

Furthermore, the angular setting range of the conical shoulder has been determined so that the appropriate deformation forces can be applied to compress and conically deform the rivet body in the manner described above. If the angle Z of this conical surface was greater than 110 degrees then there would be a risk that insufficient axial force would be applied during setting and that the head could be pulled into the rivet body. If this angle Z was less than 90 degrees then there would be no angular force component to effect conical deformation of the tail end of the rivet and the mandrel head is likely to be ejected without the rivet being correctly set.

In this preferred embodiment, the rivet body head 20 is shown to be counter-sunk so that this head 20 is also maintained flush with the outer work piece 16 once set, although this feature is optional and it will be appreciated that the current invention may utilize a conventional blind rivet which does not use a counter-sunk head.

The importance of providing the length L within the pre-defined ranges discussed above is to provide sufficient material of the rivet body to allow appropriate deformation of the rivet body to fill the enlarged hole 12 after setting and to form a sufficiently robust set-end of the rivet that will resist any applied tensile loading on that joint, but not to result in excess rivet body material which cannot be accommodated by the counter-sunk region 46 of the hole 12 and may project beyond the blind side of the workpiece.

Figure 3:
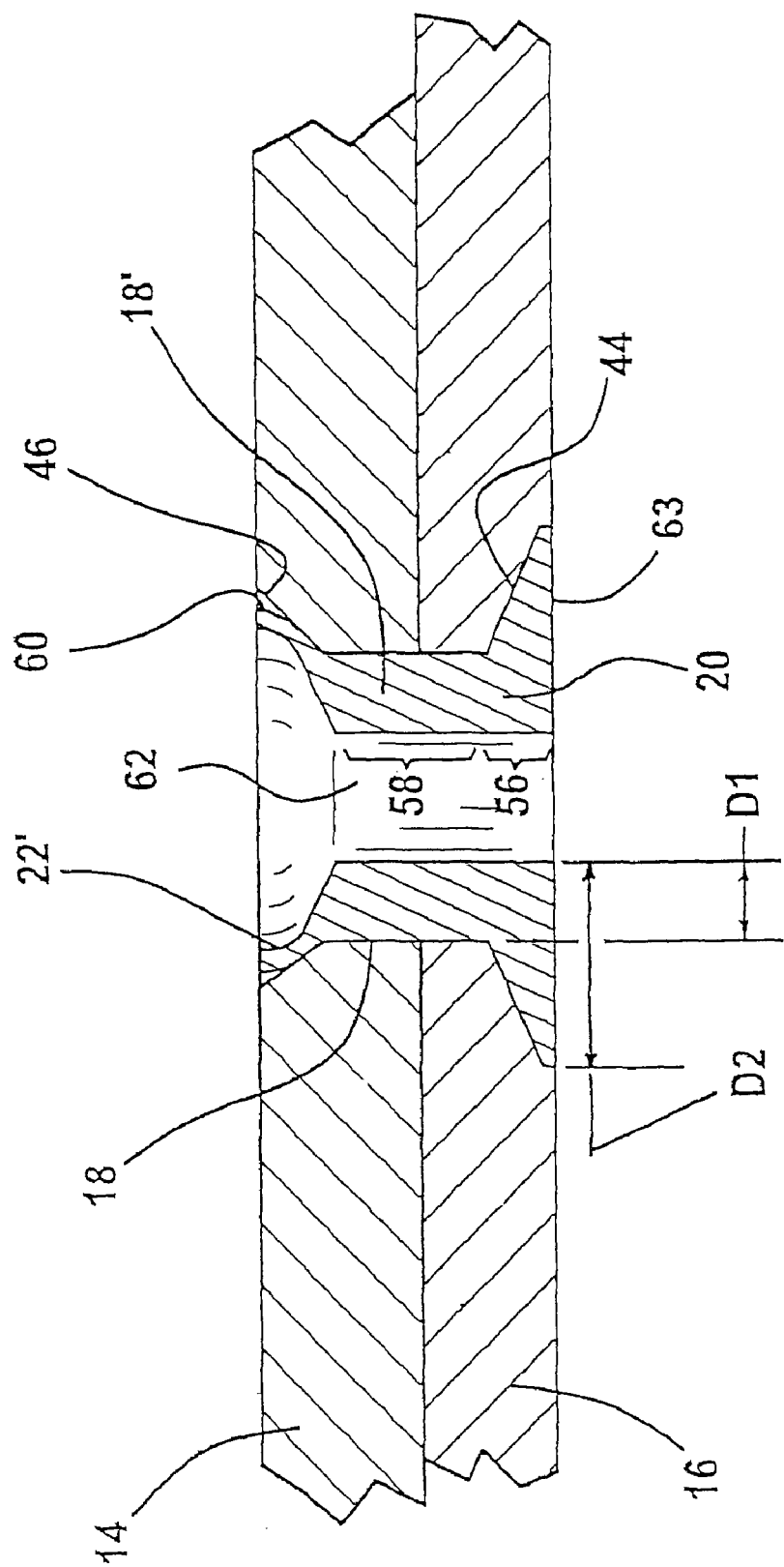
FIG. 3 is an enlarged cross-sectional view of the set rivet body of the rivet of FIG. 2.

As can be observed in FIGS. 2 and 3, cup-shaped tail end 22' of the rivet has a substantially rounded/curved and expanded outside surface 60 after setting. Furthermore, a flat face 63 is present at a tool end or flanged head 20 of the rivet, and an inside diameter at a body segment 58 and an inside diameter at a flanged head segment 56 define a continuous through-bore 62 with the same diameter, both before and after setting. Moreover, a cross-sectional wall thickness D2 of the preformed flange 20, measured perpendicular to the inside surface at head segment 56, is greater than a cross-sectional wall thickness D1 of the hollow tubular body section 58, both before and after rivet setting.

While the above detailed description describes the preferred embodiment of the present invention, it should be understood that the present invention is susceptible to modification, variation and alteration without deviating from the scope and fair meaning of the subjoined claims.

The invention claimed is:

1. A blind rivet system comprising:
   at least two workpieces defining a tool-facing surface and an opposite blind surface;
   an axially extending hollow tubular body having a tail end at one end and a pre-formed, hollow and radially enlarged flange at the other end adjacent said tool-facing surface; and
   a mandrel having a stem which extends co-axially though said body and having an enlarged head adjacent said tail end of said body, said head having an outer diameter greater than an inner diameter of said body;
   wherein said mandrel has a conical shoulder extending between said outer diameter of said head and said stem, and said stem having a weakened region adjacent said conical shoulder;
   wherein said mandrel upsets said tail end so that said tail end is expanded into a counter-sunk region of said blind surface such that said expanded tail end does not extend substantially above said blind surface;
   wherein a cross-sectional wall thickness of said preformed radially enlarged flange is greater than a cross-sectional wall thickness of said hollow tubular body both before and after setting; and
   wherein said head diameter is between 4% and 9% greater than an outer diameter of said body.

2. The rivet system of claim 1 wherein the head and stem are removable from the body during or after rivet-setting.

3. The rivet system of claim 1 wherein the at least two workpieces defines part of a computer.

4. The rivet system of claim 1 wherein the body includes a through-bore having the same constant internal diameter at both a central section between the ends and the flange.

5. The blind rivet system as claimed in claim 1 wherein the enlarged flange has a substantially conical outside surface both before and after setting, and the tail end has a substantially rounded and expanded outside shape and a substantially cup-like inside shape after setting.

6. A blind rivet system comprising:
   at least two workpieces defining a tool-facing surface and an opposite blind surface;
   an axially extending hollow tubular body having a tail end at one end and a pre-formed, hollow and radially enlarged flange at the other end adjacent said tool-facing surface; and
   a mandrel having a stem which extends co-axially though said body and having an enlarged head adjacent said tail end of said body, said head having an outer diameter greater than an inner diameter of said body;

wherein said mandrel has a conical shoulder extending between said outer diameter of said head and said stem, and said stem having a weakened region adjacent said conical shoulder;

wherein said mandrel upsets said tail end so that said tail end is expanded into a counter-sunk region of said blind surface such that said expanded tail end does not extend substantially above said blind surface;

wherein a cross-sectional wall thickness of said preformed radially enlarged flange is greater than a cross-sectional wall thickness of said hollow tubular body both before and after setting; and wherein said conical shoulder is inclined at an angle of between 91 and 110 degrees to said stem.

7. A blind rivet system comprising:

at least two workpieces defining a tool-facing surface and an opposite blind surface;

an axially extending hollow tubular body having a tail end at one end and a pre-formed, hollow and radially enlarged flange at the other end adjacent said tool-facing surface; and a mandrel having a stem which extends co-axially though said body and having an enlarged head adjacent said tail end of said body, said head having an outer diameter greater than an inner diameter of said body;

wherein said mandrel has a conical shoulder extending between said outer diameter of said head and said stem, and said stem having a weakened region adjacent said conical shoulder;

wherein said mandrel upsets said tail end so that said tail end is expanded into a counter-sunk region of said blind surface such that said expanded tail end does not extend substantially above said blind surface;

wherein a cross-sectional wall thickness of said preformed radially enlarged flange is greater than a cross-sectional wall thickness of said hollow tubular body both before and after setting; and wherein the axial length of said body is between 25% and 55% greater than a combined thickness of said at least two workpieces, prior to rivet setting.

8. The rivet system of claim 7 wherein the mandrel and body constitute a blind rivet, and the mandrel does not obstruct the hollow body after rivet setting.

9. The blind rivet system as claimed in claim 7 wherein said head diameter is between 4% and 9% greater than an outer diameter of said body.

10. The rivet system of claim 7 wherein the at least two workpieces defines part of a computer.

11. A rivet apparatus comprising:

at least one workpiece having an outer surface and an inner surface, each surface including a counter-sunk cavity therein connected by a hole;

a hollow blind rivet including a first transversely enlarged flange at a first end and a second transversely enlarged flange at a second and opposite end; and a mandrel including a stem and a head, the head including a conical section operably creating the first flange during setting, the head and stem being removable from the rivet during or after rivet-setting;

wherein the first flange is located in the counter-sunk cavity in the outer surface of the at least one workpiece such that the rivet is substantially flush with or recessed below the outer surface;

wherein the second flange is located in the counter-sunk cavity in the inner surface of the at least one workpiece such that the rivet is substantially flush with or recessed below the inner surface; and wherein a through-bore has a constant diameter extending from the second end and through a central section of the rivet.

12. The rivet apparatus of claim 11 wherein the through-bore has a larger diameter at the first end than at the central section of the rivet.

13. The rivet apparatus of claim 11 wherein the counter-sunk cavities are each substantially frusto-conical.

14. The rivet apparatus of claim 11 wherein the at least one workpiece defines part of a computer.

15. A blind rivet assembly comprising:
(a) a blind rivet comprising a flange created prior to rivet setting and a cylindrical body segment;
    (i) the flange having a substantially conical outside surface and a substantially flat end surface enlarged greater than the body segment;
    (ii) the body segment and flange having a bore with a substantially uniformly dimensioned inside diameter at least prior to rivet setting; and
    (iii) a cross-sectional wall thickness of the flange being larger than a cross-sectional wall thickness of the body segment; and
(b) a mandrel comprising:
    (i) an elongated stem located in the bore at least prior to rivet setting;
    (ii) an enlarged head located adjacent a blind-end of the rivet at least prior to rivet setting; and
    (iii) a tapered shoulder located between the stem and the head; and
wherein the bore of the blind rivet is unobstructed after rivet setting; and
wherein an outer diameter of the head of the mandrel is between 4% and 9% greater than an outer diameter of the body segment, prior to setting.

16. The blind rivet assembly of claim 15 wherein the mandrel is broken during rivet setting.

17. The blind rivet assembly of claim 15 wherein the stem of the mandrel is smooth from at least the rivet flange to a tool-end of the stem.

18. A blind rivet assembly comprising:
(a) a blind rivet comprising a flange created prior to rivet setting and a cylindrical body segment,
    (i) the flange having a substantially conical outside surface and a substantially flat end surface enlarged greater than the body segment;
    (ii) the body segment and flange having a bore with a substantially uniformly dimensioned inside diameter at least prior to rivet setting; and
    (iii) a cross-sectional wall thickness of the flange being larger than a cross-sectional wall thickness of the body segment; and
(b) a mandrel comprising:
    (i) an elongated stem located in the bore at least prior to rivet setting;
    (ii) an enlarged head located adjacent a blind-end of the rivet at least prior to rivet setting;
    (iii) a tapered shoulder located between the stem and the head;
wherein the bore of the blind rivet is unobstructed after rivet setting; and
wherein the tapered shoulder of the mandrel is inclined at an angle of between 91 and 110 degrees to the stem.

19. The blind rivet assembly of claim 18 wherein the tapered shoulder of the mandrel is inclined at an angle of between 98 and 102 degrees to the stem.

20. The blind rivet assembly of claim 18 wherein an outer diameter of the head of the mandrel is between 4% and 9% greater than an outer diameter of the body segment, prior to setting.

21. A blind rivet assembly comprising:
   (a) a blind rivet comprising a flange and a cylindrical body segment;
      (i) the flange having a substantially conical outside surface and an end surface enlarged greater than the body segment;
      (ii) the body segment and flange having a bore with a substantially uniformly dimensioned inside diameter at least prior to rivet setting; and
      (iii) a cross-sectional wall thickness of the flange being larger than a cross-sectional wall thickness of the body segment both before and after rivet setting;
   (b) a mandrel comprising:
      an elongated stem located in the bore before and during rivet setting;
      (ii) an enlarged head located adjacent a blind-end of the rivet before and during rivet setting; and
      (iii) a tapered shoulder located between the stem and the head; and
   (c) computer components including aligned holes with counter-sunk ends, the blind rivet being set in the holes to join together the computer components;
   wherein the mandrel is broken during rivet setting to the computer components and the bore in the blind rivet is unobstructed after rivet setting;
   wherein the shoulder of the mandrel outwardly expands the blind-end of the rivet into the adjacent counter-sunk end of the computer components at or below the adjacent outside surface of the computer components during rivet setting; and
   wherein an outer diameter of the head of the mandrel is between 4% and 9% greater than an outer diameter of the body segment, prior to setting.

22. The blind rivet assembly of claim 21 wherein the tapered shoulder of the mandrel is inclined at an angle of between 98 and 102 degrees to the stem.

23. The blind rivet assembly of claim 21 wherein the counter-sunk ends are each substantially frusto-conical.

24. A blind rivet assembly comprising:
   (a) a blind rivet comprising a flange and a cylindrical body segment;
      (i) the flange having a substantially conical outside surface and an end surface enlarged greater than the body segment;
      (ii) the body segment and flange having a bore with a substantially uniformly dimensioned inside diameter at least prior to rivet setting; and
      (iii) a cross-sectional wall thickness of the flange being larger than a cross-sectional wall thickness of the body segment both before and after rivet setting;
   (b) a mandrel comprising:
      (i) an elongated stem located in the bore before and during rivet setting;
      (ii) an enlarged head located adjacent a blind-end of the rivet before and during rivet setting; and
      (iii) a tapered shoulder located between the stem and the head; and
   (c) computer components including aligned holes with counter-sunk ends, the blind rivet being set in the holes to join together the computer components;
   wherein the mandrel is broken during rivet setting to the computer components and the bore in the blind rivet is unobstructed after rivet setting;
   wherein the shoulder of the mandrel outwardly expands the blind-end of the rivet into the adjacent counter-sunk end of the computer components at or below the adjacent outside surface of the computer components during rivet setting; and
   wherein the tapered shoulder of the mandrel is inclined at an angle of between 91 and 110 degrees to the stem.

25. The blind rivet assembly of claim 24 wherein an outer diameter of the head of the mandrel is between 4% and 9% greater than an outer diameter of the body segment, prior to setting.

* * * * *